(12) United States Patent
Basnet et al.

(10) Patent No.: US 11,805,321 B2
(45) Date of Patent: *Oct. 31, 2023

(54) SYSTEM AND METHOD FOR AUTOMATIC CONTROL OF EXPOSURE TIME IN AN IMAGING INSTRUMENT

(71) Applicant: Climate LLC, Saint Louis, MO (US)

(72) Inventors: Bikash Basnet, St. Louis, MO (US); Keely Roth, San Francisco, CA (US); Demir Devecigil, St. Charles, MO (US); Valeriy Kovalskyy, Chesterfield, MO (US)

(73) Assignee: CLIMATE LLC, Saint Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/672,335

(22) Filed: Feb. 15, 2022

(65) Prior Publication Data

US 2022/0174202 A1 Jun. 2, 2022

Related U.S. Application Data

(63) Continuation of application No. 16/821,369, filed on Mar. 17, 2020, now Pat. No. 11,258,955.

(60) Provisional application No. 62/819,855, filed on Mar. 18, 2019.

(51) Int. Cl.
*H04N 23/73* (2023.01)
*H04N 25/63* (2023.01)
*H04N 25/67* (2023.01)

(52) U.S. Cl.
CPC ............. *H04N 23/73* (2023.01); *H04N 25/63* (2023.01); *H04N 25/67* (2023.01)

(58) Field of Classification Search
CPC .... H04N 5/2353; H04N 5/365; H04N 5/2176; H04N 5/23225; H04N 17/002; H04N 5/2351

See application file for complete search history.

(56) References Cited

U.S. PATENT DOCUMENTS

| 10,602,119 | B1 | 3/2020 | Bakhtazad et al. |
| 11,258,955 | B2 * | 2/2022 | Basnet .................. H04N 25/63 |
| 2015/0309153 | A1 | 10/2015 | Igari et al. |
| 2017/0085755 | A1 | 3/2017 | Kim et al. |
| 2017/0359536 | A1 | 12/2017 | Lee et al. |
| 2018/0025518 | A1 | 1/2018 | Horie |
| 2018/0080818 | A1 | 3/2018 | Tiwari et al. |

(Continued)

OTHER PUBLICATIONS

Basnet et al., U.S. Office Action dated Jun. 15, 2021, directed to U.S. Appl. No. 16/821,369; 11 pages.

(Continued)

*Primary Examiner* — Gevell V Selby
(74) *Attorney, Agent, or Firm* — Harness, Dickey & Pierce, P.L.C.

(57) ABSTRACT

In an embodiment, a computer-implemented method of calibrating an imaging system in real-time, comprising: obtaining a first reading by a first sensor; establishing a dynamic link between the first reading and exposure time of a second sensor; using the dynamic link to control the exposure time of the second sensor; obtaining a second reading by the second sensor during the controlled exposure time; wherein the steps are performed by one or more computing devices.

24 Claims, 11 Drawing Sheets

1100

1105 Obtain observed solar irradiance (ESun obs)

1110 Determine maximum irradiance value of the light detectors (EDetector max)

1115 Calibrate the target looking sensor exposure time by using ESun obs and EDetector max to scale the nominal exposure time of the target looking sensor

(56) References Cited

U.S. PATENT DOCUMENTS

2018/0184073 A1   6/2018  Burgess
2018/0240251 A1   8/2018  Kitagawa
2018/0343367 A1  11/2018  Darvas
2019/0329903 A1  10/2019  Thompson et al.

OTHER PUBLICATIONS

Basnet et al., U.S. Office Action dated Mar. 31, 2021, directed to U.S. Appl. No. 16/821,369; 10 pages.
Current Claims in application No. PCT/US2020/023168, dated Jun. 2020, 4 pages.
The International Searching Authority, "Search Report", in application No. PCT/US2020/023168, dated Jun. 15, 2020, 20 pages.

* cited by examiner

Fig. 2
(a)
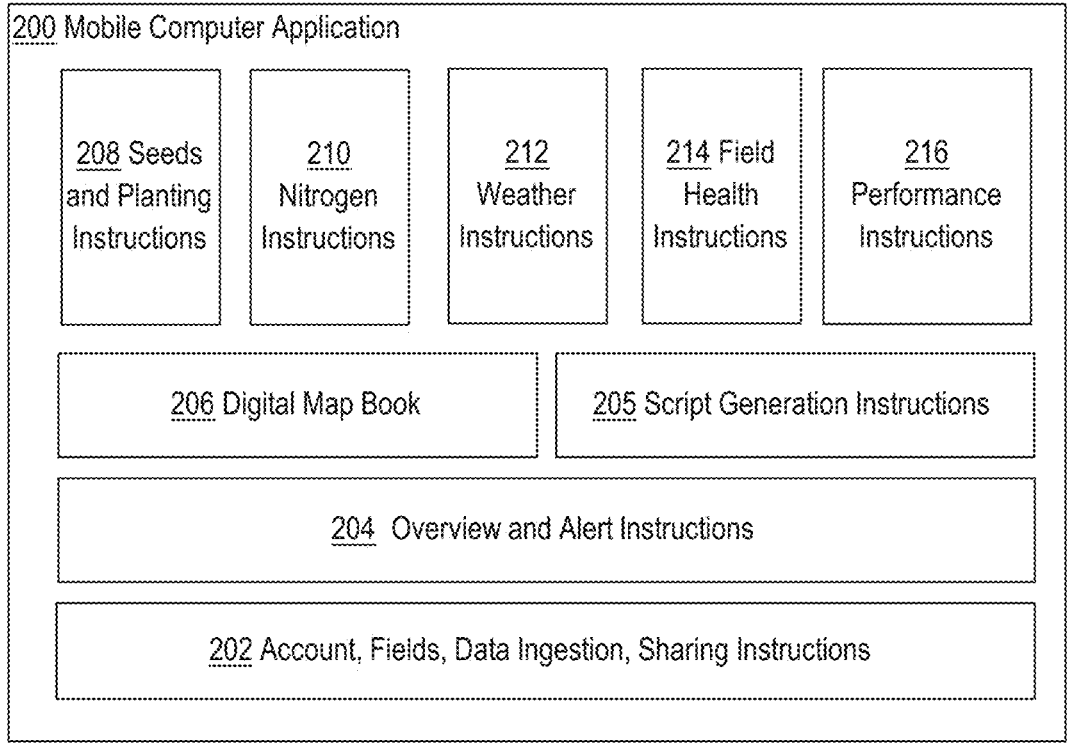
(b)
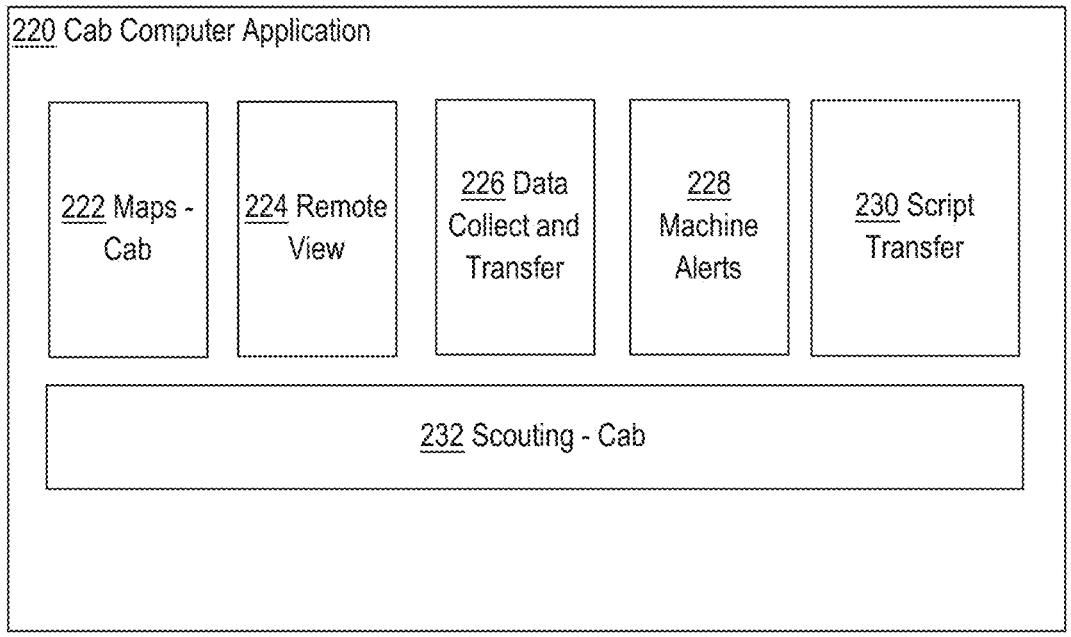

FIG. 6

Data Manager

Nitrogen | Planting | Practices | Soil

| Planting 1(4 Fields) | Planting 2(0 Fields) | Planting 3(0 Fields) | Planting 4(1 Fields) | + Add New Planting Plan |
|---|---|---|---|---|
| Crop Corn Product | Crop Corn Product | Crop Corn Product | Crop Corn Product | |
| Plant Date: 2016-04-12 | Plant Date: 2016-04-15 | Plant Date: 2016-04-13 | Plant Date: 2016-04-13 | |
| ILU 112 | Pop: 34000 | ILU 83 | Pop: 34000 | ILU 83 | Pop: 34000 | ILU 112 | Pop: 34000 | |
| [Edit] [Apply] | [Edit] [Apply] | [Edit] [Apply] | [Edit] [Apply] | |

| | | CROP | PLANTED ACRES | PRODUCT | RELATIVE MATURITY | TARGET YIELD | POPULATION(AVG) | PLA |
|---|---|---|---|---|---|---|---|---|
| ☐ | Select All | | | | | | | |
| ☐ | Ames, IA 1<br>Corn \| 100 \| Boone, IA | Corn | --- | DMC82-M | 112 | 160 | 34000 | Apr |
| ☐ | Austin, MN 1<br>Corn \| 100 \| Fredricks, MN | Corn | --- | DMC82-M | 114 | [160] | 36000 | Apr |
| ☐ | Boone, IN 1<br>Corn \| 100 \| Boone, IA | Corn | --- | DMC82-M | 112 | 150 | 34000 | Apr |
| ☐ | Champaign 1<br>Corn \| 100 \| Champaign, IL | Corn | --- | --- | 112 | 200 | 34000 | Apr |
| ☐ | E Nebraska 1<br>Corn \| 100 \| Burt, NE | Corn | --- | --- | 112 | 160 | 34000 | Apr |

SYSTEM AND METHOD FOR AUTOMATIC CONTROL OF EXPOSURE TIME IN AN IMAGING INSTRUMENT

CROSS REFERENCE TO RELATED APPLICATIONS

This application is a continuation of U.S. application Ser. No. 16/821,369 filed Mar. 17, 2020, which claims the benefit of U.S. Provisional Application No. 62/819,855, filed Mar. 18, 2019, the entire contents of each of which are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2020 The Climate Corporation.

FIELD OF THE DISCLOSURE

One technical field of the present disclosure is computer-aided processing of images captured using unmanned aircraft systems. Another technical field of the present disclosure is automatically controlling exposure time in an imaging instrument. Another technical field of the present disclosure is processing and using, in real-time, data captured by incident light sensors.

BACKGROUND

Imaging systems designers have produced numerous solutions that reconcile limitation of detector sensitivity to light and variability in radiation signals coming from target surfaces. Most of these solutions are focused on delivering maximum contrast of detector counts also known as digital numbers (DN) in acquired imagery. Such approaches have been proven effective in consumer camera products and have migrated into imaging instruments on unmanned aircraft systems (UAS). Initial success was demonstrated in applications that required only single reflective band imaging or multiple bands placed in close spectral proximity. However, UAS-carried imaging applications for agriculture use are challenging the efficacy of contrast based approaches because of the need to use light signals from distant portions of reflective spectrum while simultaneously preserving their relative proportions. Accurate data collection is crucial for assessing field conditions, for example, to prevent losses in crop yield.

Thus, there is a need for a more refined and scientifically sound capture of key spectral signals of crops.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 6 depicts an example embodiment of a spreadsheet view for data entry.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. EXAMPLE UAS-CARRIED IMAGING SYSTEM
   3.1 CAPTURE OF INCIDENT LIGHT
   3.2 LINKAGE TO EXPOSURE TIME OF TARGET LOOKING SENSOR
   3.3 PROCEDURAL OVERVIEW
4. OTHER ASPECTS OF DISCLOSURE

1. General Overview

Control of exposure time in unmanned aircraft systems (UAS) carried imaging instruments is critical for image quality and capability to see differences in light signals from targets. Variability in illumination conditions and in optical properties of the targets create a challenge for capturing images as the capabilities of imaging instruments are limited. According to various embodiments, computer-implemented methods and systems are provided that employ a dedicated incident light sensor and readings therefrom to provide real-time processing and automatic control of exposure time of a target looking sensor.

In one aspect, a computer-implemented method of calibrating an imaging system in real-time, comprising obtaining a first reading by a first sensor, establishing a dynamic link between the first reading and exposure time of a second sensor, using the dynamic link to control the exposure time of the second sensor, obtaining a second reading by the second sensor during the controlled exposure time. The steps are performed by one or more computing devices.

In another aspect, an imaging system comprises a first sensor, a second sensor, and a system control board all communicatively coupled together. The first sensor is configured to obtain a first reading. The system control board is configured to establish a dynamic link between the first reading and exposure time of the second sensor and to use the dynamic link to control the exposure time of the second sensor. The second sensor is configured to obtain a second reading during the controlled exposure time. Other aspects, features and embodiments will become apparent from the disclosure as a whole.

2 Example Agricultural Intelligence Computer System 2.1 Structural Overview

Figure 1:
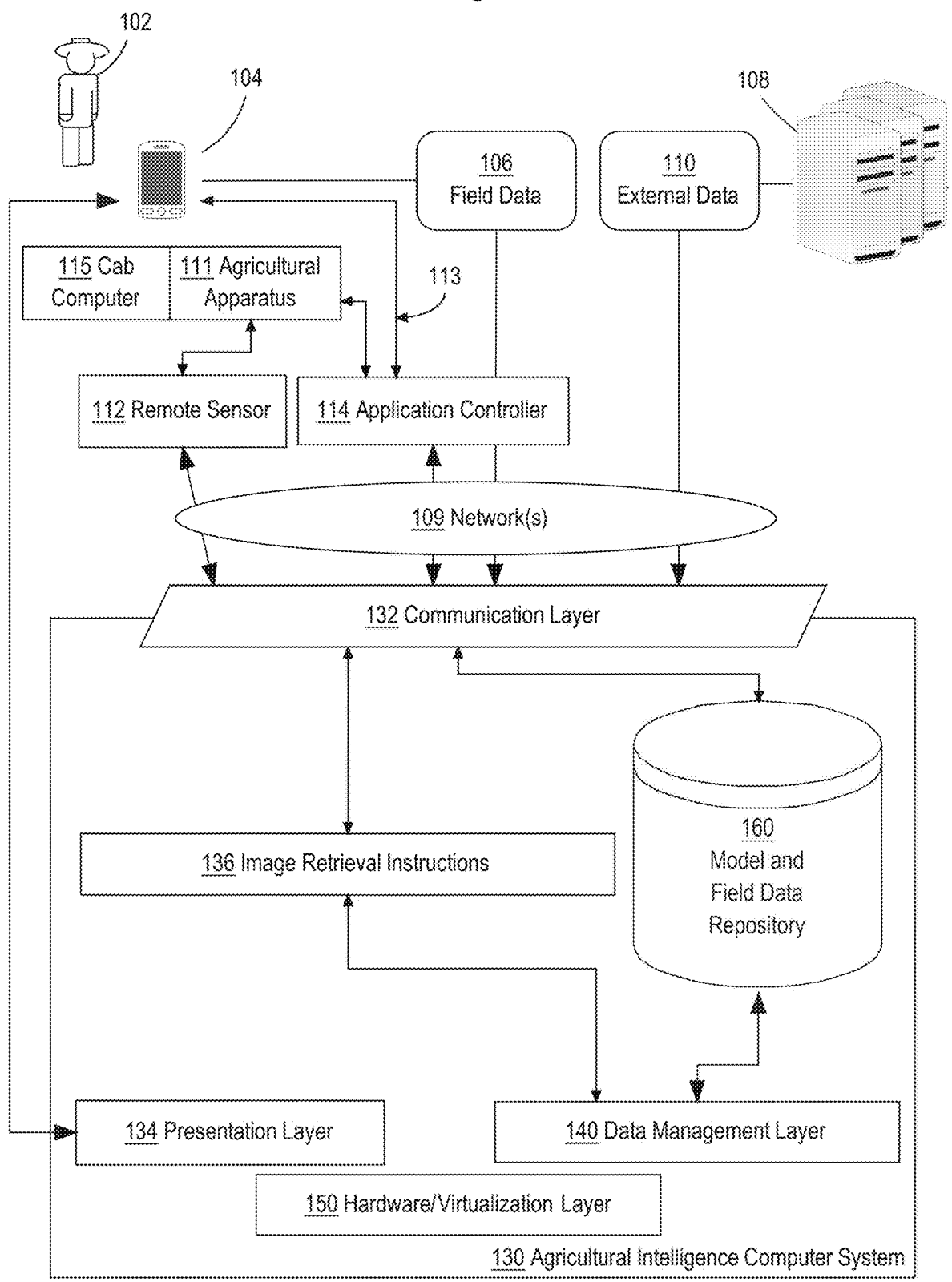
FIG. 1 illustrates an example computer system that is configured to perform the functions described herein, shown in a field environment with other apparatus with which the system may interoperate.

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, prescription maps, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
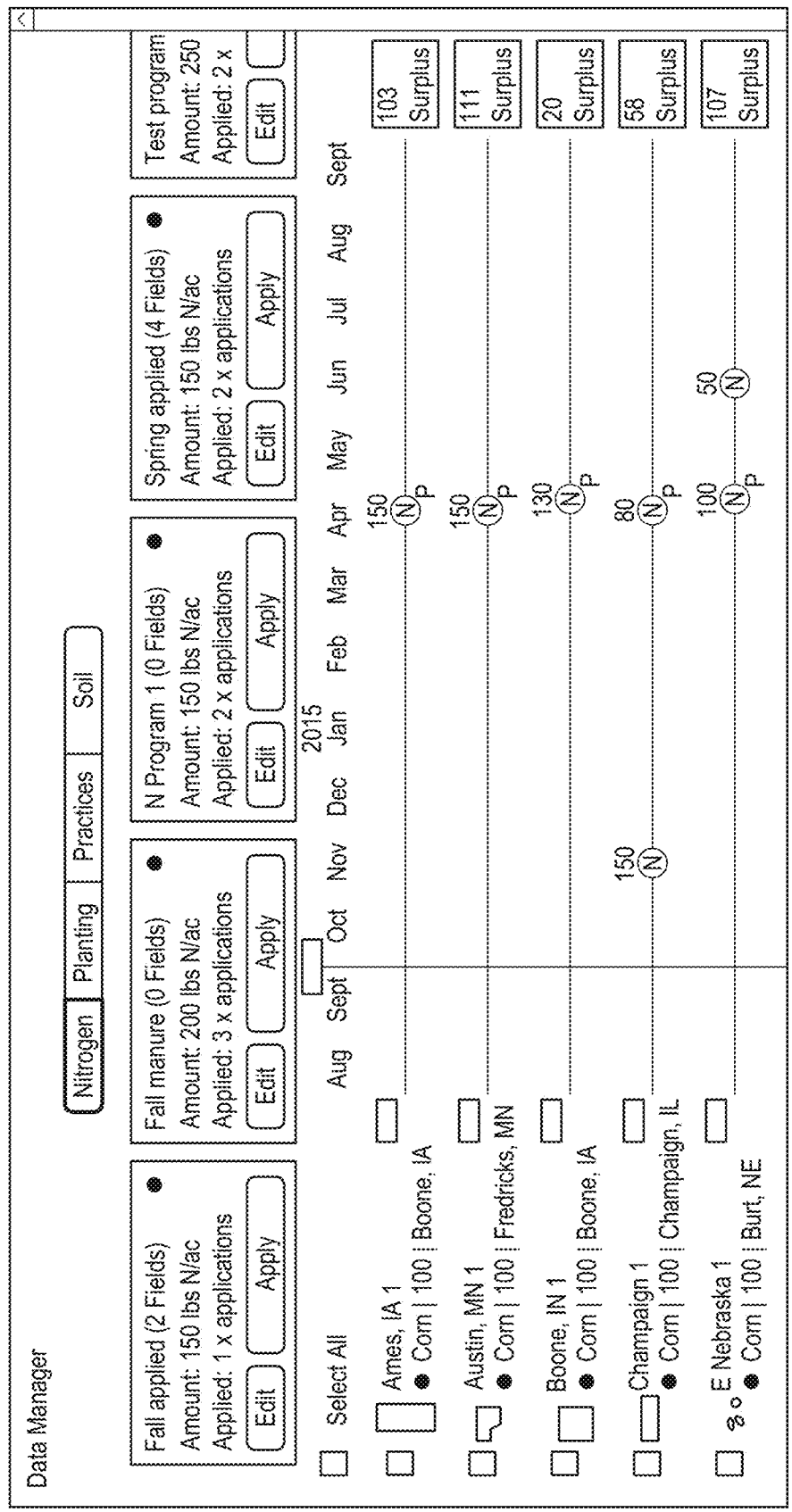
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, image retrieval instructions 136 comprises a set of one or more pages of main memory, such as RAM, in the agricultural intelligence computer system 130 into which executable instructions have been loaded and which when executed cause the agricultural intelligence computer system to perform the functions or operations that are described herein with reference to those modules. For example, the image retrieval instructions 136 may comprise a set of pages in RAM that contain instructions which when executed cause performing obtaining data from an unmanned aircraft system (UAS)-carried imaging system 700 as further described herein, for further analysis. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, the image retrieval instructions 136 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computer system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
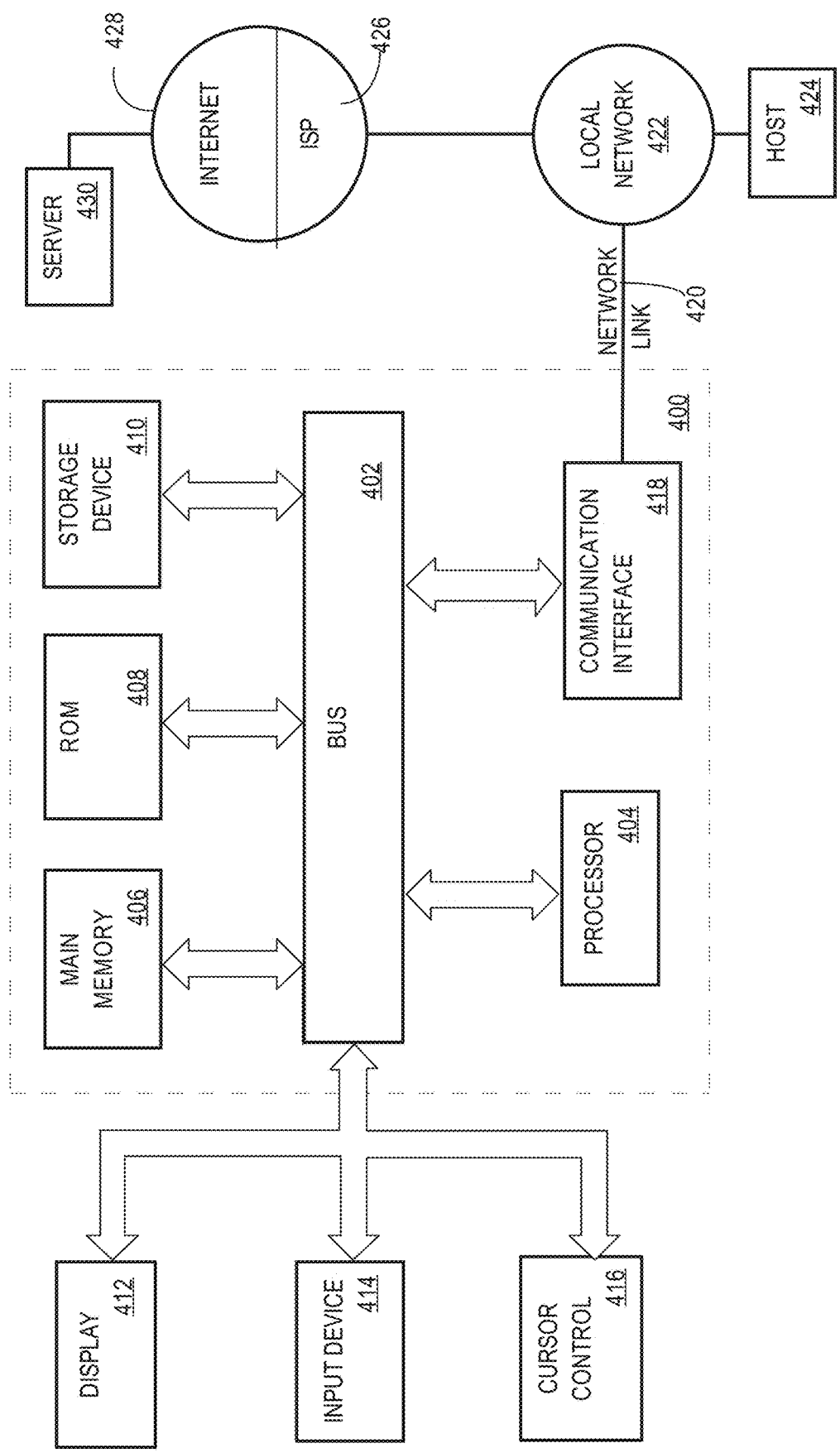
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2 Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3 Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4 Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
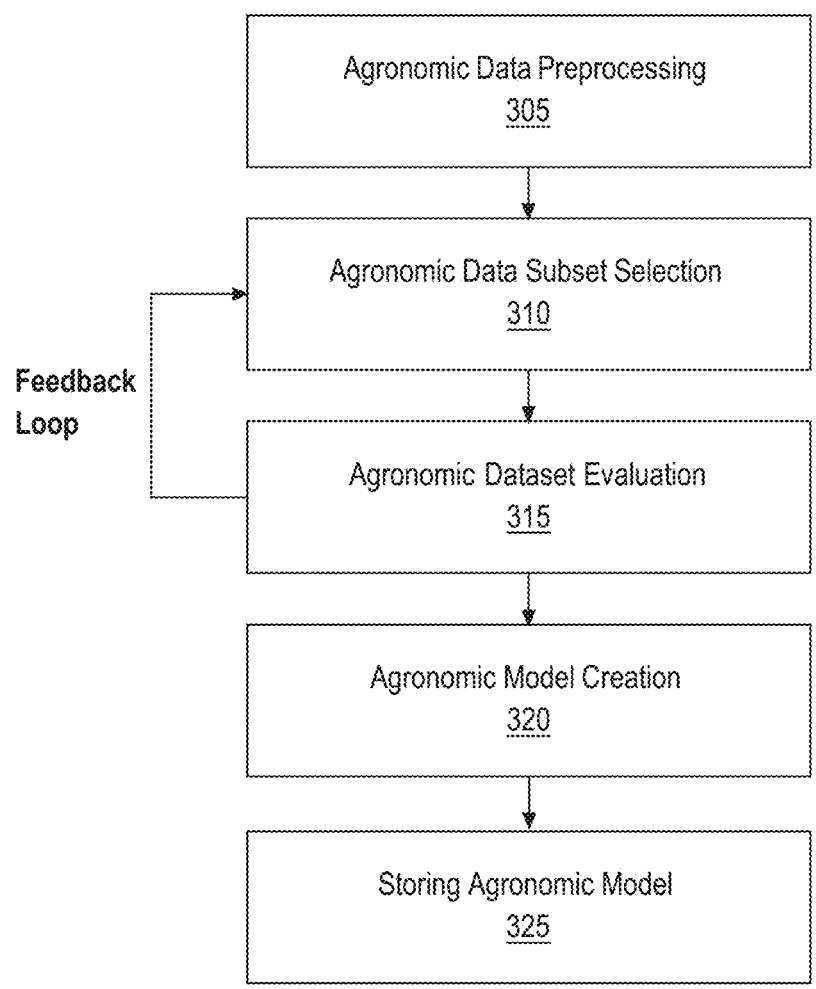
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3.0 Example Uas-Carried Imaging System

An unmanned aircraft system (UAS) is an aerial vehicle that can hover above ground, such as over crop fields. The UAS may include digital imaging capabilities to provide farmers a richer picture of their fields. In some embodiments, the UAS is equipped with an imaging system to collect field-level data.

Figure 7:
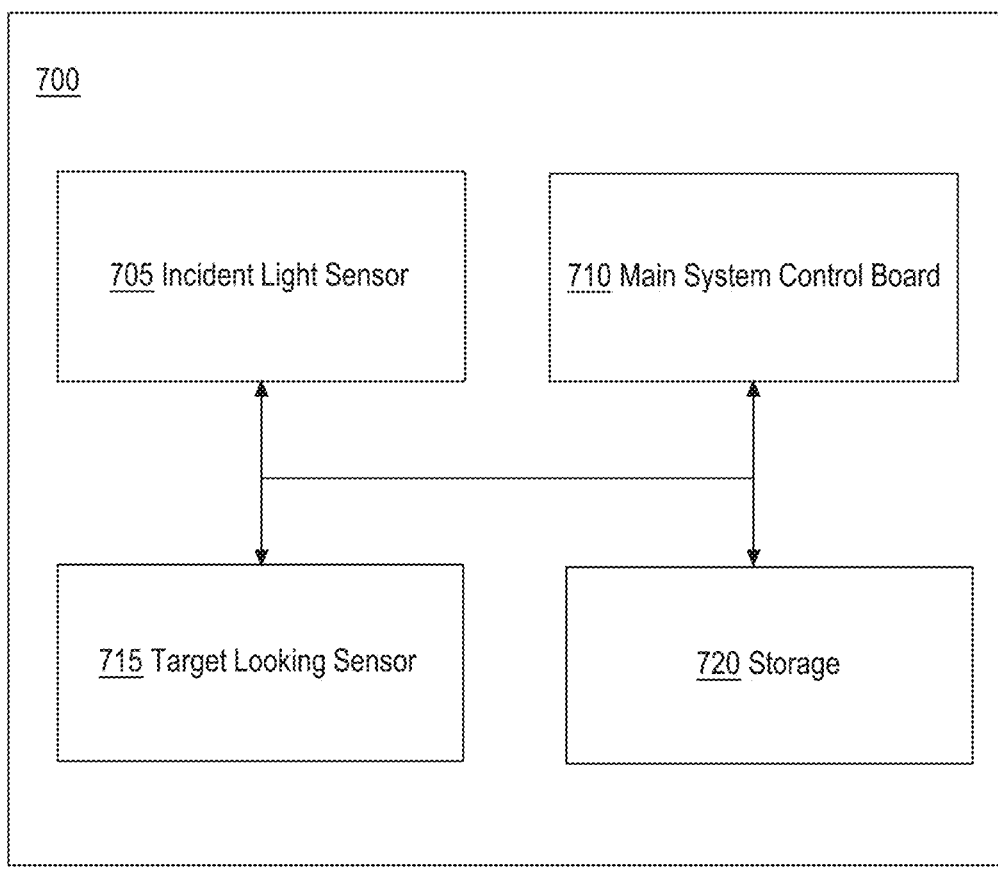
FIG. 7 illustrates an example UAS-carried imaging system, in accordance with some embodiments.

FIG. 7 illustrates an example UAS-carried imaging system, in accordance with some embodiments. In an embodiment, a UAS-carried imaging system 700 shown in FIG. 7 comprises an incident light sensor 705, a main system control board 710 coupled to a target looking sensor 715 that interoperate under stored program control to provide exposure control to improve the quality of data collected during a UAS mission. The UAS-carried imaging system 700 may comprise a system storage device 720 for storing data including images and a wireless networking interface for wirelessly communicating images or other data to a host computer and/or for receiving instructions, programs, or software updates.

In an embodiment, incident light sensor 705 is an upward looking sensor that is positioned to measure the color spectrum of incident light from a light source, such as the Sun. In an embodiment, target looking sensor 715 is a downward looking sensor that is positioned to detect light reflected from target(s). Data captured by the incident light sensor 705 and/or the target looking sensor 715 is processed in real-time or in near-time by a processor or micro-controller on the main system control board 710 to control the incident light sensor 705, the target looking sensor 715, and/or other components of the UAS-carried imaging system 700 which are not shown in FIG. 7 to avoid obscuring the focus of the disclosure. The main system control board 710 may include a display interface and/or a communication interface. Parameter and control inputs may be received via the communication interface.

The UAS-carried imaging system 700 of these embodiments provides adequate reading of incident light and adequate capture of light reflected off a target. A target may be a specific object such as plant, a specific crop variety, an optical view, or an entire field or subfield.

An adequate capture of light reflected off a target determines a value of a final image product. However, by the nature of radiative transfer, the strength of light signal from the target is dependent on the amount of incident light, which in turn is determined by the position and strength of the light source, such as the Sun. An adequate reading of incident light may be set according to the Sun's position relative to the target. The incident light reading is linked with the reflected light of the target to calibrate exposure time, or otherwise to control exposure, of the target looking sensor 715.

3.1 Capture of Incident Light

The incident light sensor of the UAS-carried imaging system is configured to capture illumination conditions. At any time during proper use of the incident light sensor, the incident light sensor is expected to give meaningful readings of energy of a given wavelength range integrated over the hemisphere of the incident light sensor, which is referred to as irradiance (E). The irradiance depends mostly on strength and position of the light source. Knowledge of light source strength and position will help set exposure time of the incident light sensor and ensure meaningful readings, particularly when the light source is as well characterized as the Sun.

Figure 8:
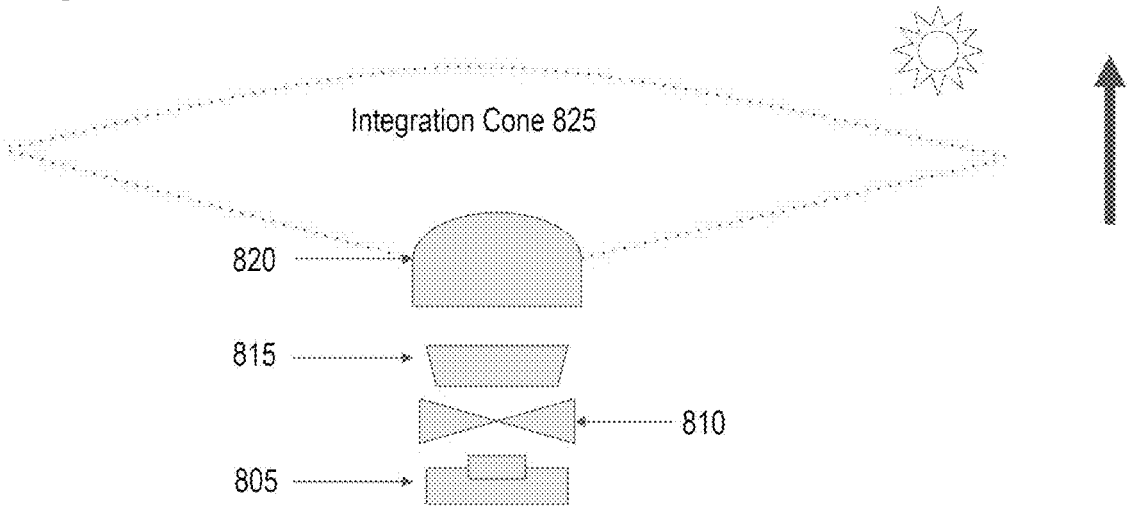
FIG. 8 illustrates an example incident light sensor, in accordance with some embodiments.

FIG. 8 illustrates an example incident light sensor, in accordance with some embodiments. The incident light sensor 705 of FIG. 7 may be configured as shown for the incident light sensor 800 of FIG. 8. Elements of the incident light sensor 800 are arranged linearly adjacent one another so that rays from a source of incident light within an integration cone 825 pass through successive elements in a downward direction as oriented in FIG. 8. In an embodiment, the incident light sensor 800 comprises a light detector 805, an exposure time controller 810 linearly affixed above the light detector, a light filter 815 linearly affixed above the exposure time controller, and a cosine corrector/light diffuser 820 linearly affixed above the light filter 815.

The light diffuser 820 is configured as a lens to capture light from a light source within the integration cone 825. When the light source is outside the integration cone 825, the light diffuser 820 may not be sensitive to light and/or the incident light sensor 800 may not give meaningful readings. The captured light goes through the light filter 815, which is configured to focus the light on a certain wavelength for the exposure time controller 810 to control the time and the duration the captured light will hit the light detector 805.

Some criteria for the incident light sensor 800 to provide meaningful readings include the light source being within the integration cone 825, no undersaturation of the light detector 805 when the light source is at low elevation angles (high zenith angles), and no oversaturation of the light detector 805 when the light source is a high elevation angles (low zenith angles). To satisfy these criteria, acquisition time can be restricted to x hours after sunrise and y hours before sunset, and minimum solar irradiance ($E_{Sun\ min}$) for a given wavelength at the lowest elevation angle allowed by the light diffuser 820 and maximum solar irradiance ($E_{Sun\ max}$) for a given wavelength at the highest elevation angle allowed by the light diffuser 820 can be obtained to calibrate the incident light sensor 800 exposure time to capture all readings between $E_{Sun\ min}$ and $E_{Sun\ max}$. A reading, by the incident light sensor 800, within the range of $E_{Sun\ min}$ and $E_{Sun\ max}$ transforms into observed solar irradiance ($E_{Sun\ obs}$).

In particular, the light detector 805 has a range of working conditions limited by the amounts of light at which the light detector 805 oversaturates and undersaturates. Knowing the rates of light per unit time from the maximum solar irradiance ($E_{Sun\ max}$), the exposure time controller 810 can limit the amount of energy hitting the light detector 805 to avoid oversaturation. Additionally, knowing the minimum possible rates of energy flow from the minimum solar irradiance ($E_{Sun\ min}$), the exposure time controller 810 can ensure sufficient amount of energy reaching the light detector 805 to avoid undersaturation.

In some embodiments, having the Sun as the light source, the maximum solar irradiance ($E_{Sun\ max}$) for the time span of the UAS mission can be pre-determined or dynamically calculated in real-time as the UAS is aware of its position and location at any moment in time during operation or a mission. In some embodiments, the minimum solar irradiance ($E_{Sun\ min}$) can be set statically at the sun radiation at a limiting zenith angle of the incident light sensor integration cone 825. A range of irradiances may thus be obtained. The range of irradiances covers most of illumination conditions that can happen throughout the UAS mission, except for unusually dark cloud covers that can happen in conditions prohibited for UAS flights. To avoid sun positions outside the incident light sensor integration cone zenith angles, the mission timing may be limited to a corresponding x hours after sunrise and y hours before sunset.

Figure 9:
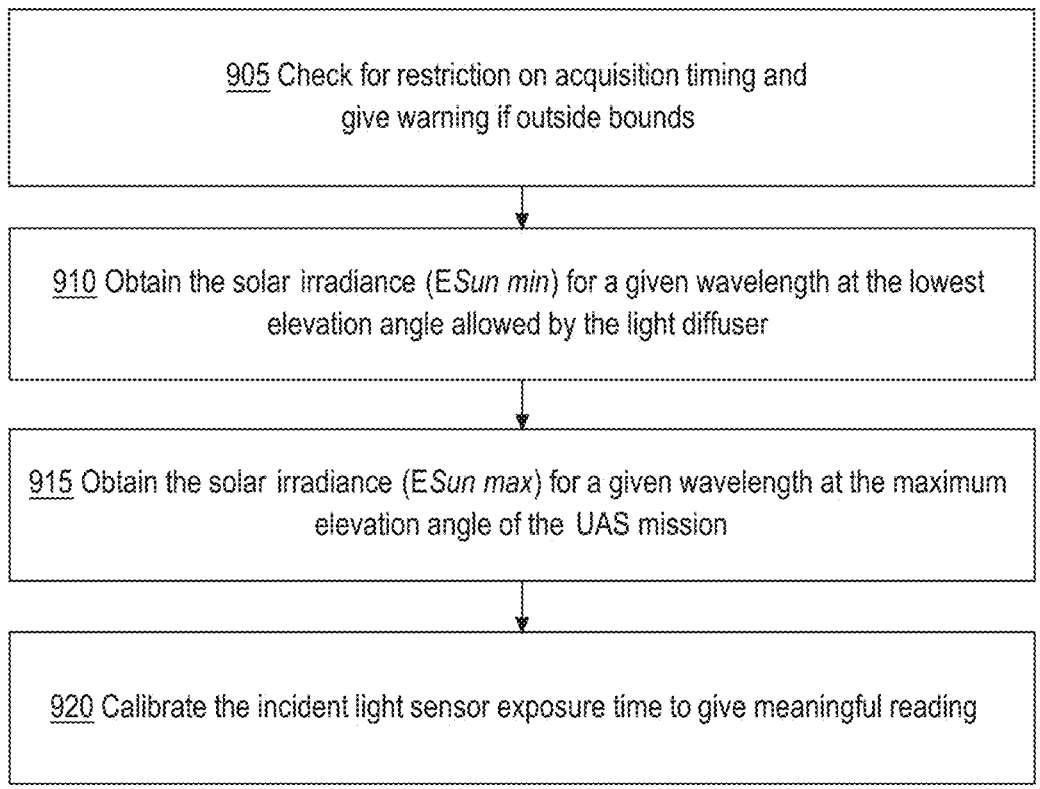
FIG. 9 illustrates an example method of controlling exposure time of an incident light sensor for a UAS mission, in accordance with some embodiments.

FIG. 9 illustrates an example method of controlling exposure time of an incident light sensor for a UAS mission, in accordance with some embodiments. The processes of each of FIG. 9, FIG. 11, FIG. 12, FIG. 13 may be embodied in one or more sequences of executable program instructions that the main system control board 710 executes, including during a UAS mission. The incident light sensor is part of the UAS-carried imaging system onboard of the UAS. The incident light sensor includes basic elements such as a light detector, exposure time controller, light filter, and a cosine corrector/light diffuser.

Method 900 begins at a step 905, where restriction on acquisition timing is checked. In an embodiment, the acquisition timing is x hours after sunrise and y hours before sunset. When the acquisition timing is outside these bounds (for example, earlier than x hours after sunrise or later than y hours before sunset), then a warning may be communicated using the display interface. An example warning may be that the incident light sensor may not be able to provide meaningful readings of energy. In an embodiment, the warning may also be transmitted to the field manager computer device 104 of FIG. 1, the agricultural intelligence computer system 130 of FIG. 1, and/or other user computing devices and systems.

At step 910, the solar irradiance ($E_{Sun\ min}$) for a given wavelength at the lowest or minimum elevation angle allowed by the light diffuser is obtained. The minimum solar irradiance ($E_{Sun\ min}$) may be set at the sun radiation at a limiting zenith angle of the incident light sensor integration cone.

At step 915, the solar irradiance ($E_{Sun\ max}$) for a given wavelength at the highest or maximum elevation angle of the UAS mission is obtained. The maximum solar irradiance ($E_{Sun\ max}$) for the time span of the UAS mission may be set at the maximum elevation angle of the UAS mission.

In some embodiments, the maximum solar irradiance ($E_{Sun\ max}$), the minimum solar irradiance ($E_{Sun\ min}$), or both may be obtained from publicly available sources of information on sun position and on seasonal atmospheric conditions. Example publicly available sources are nonprofit organizations and governmental departments/agencies including libraries. Step 910 and step 915 may be performed in parallel, or step 915 may be performed before step 910.

At step 920, exposure time of the incident light sensor is calibrated to give meaningful readings. In some embodiments, the incident light sensor uses the $E_{Sun\ max}$ to set the exposure time. In some embodiments, the exposure time controller is calibrated to capture all readings between $E_{Sun\ max}$ and $E_{Sun\ min}$. A meaningful reading transforms into an observed solar irradiance ($E_{Sun\ obs}$), which indicates the amount of light of the Sun at a particular point in time, position, and location.

The method 900 optimizes exposure settings in the incident light sensor of the UAS-carried imaging system.

3.2 Linkage to Exposure Time of Target Looking Sensor

Since most of the light on Earth's surface is reflected sunlight, it can be assumed that a function of all reflected sunlight ($E_{Sun}$) is a function of a reading of the incident light sensor (Reading$_{Incident\ light\ sensor}$), which can be used to calibrate exposure time of a target looking sensor (Exposure$_{Target\ looking\ sensor}$). These relationships are illustrated by the following:

$$\text{Exposure}_{Target\ looking\ sensor} = f(\text{Reading}_{Incident\ light\ sensor}) = f(E_{Sun}) \quad [\text{Eq. 1}]$$

Figure 10:
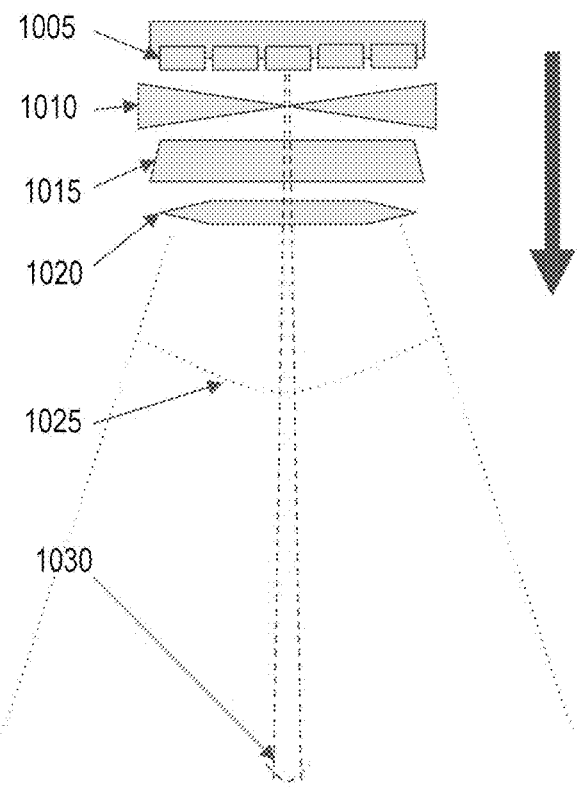
FIG. 10 illustrates an example target looking sensor, in accordance with some embodiments.

FIG. 10 illustrates an example target looking sensor, in accordance with some embodiments. The target looking sensor 715 of FIG. 7 may be configured as shown for the target looking sensor 1000 of FIG. 10. Elements of the target looking sensor 1000 are arranged linearly adjacent one another so that light reflected from a target(s) within a field of view 1025 passes through successive elements in an upward direction as oriented in FIG. 10. In an embodiment, the target looking sensor 1000 comprises as an array of light detectors 1005, an exposure time controller 1010 linearly affixed below the array of light detectors 1005, a light filter 1015 linearly affixed below the exposure time controller 1010, and a lens 1020 linearly affixed below the light filter 1015.

Light reflected from a target is captured by the lens 1020 within a field of view 1025 of the lens 1020. A target may be a specific object such as a plant, a specific crop variety, an optical view, or an entire field. The captured light goes through the light filter 1015, which is configured to focus the light on a certain wavelength for the exposure time controller 1010 to control the time and the duration the captured light will hit the array of light detectors 1005, which is used to form an image. Each detector in the array of light detectors 1005 has its own field of view 1030 that is within the target looking sensor's field of view 1025.

Similar to the incident light sensor 800, the target looking sensor 1000 has a range of working conditions limited by the amounts of light at which the light detectors 1005 in the target looking sensor 1000 oversaturate and undersaturate. These limits may be characterized by radiances, which are energies going through a field of view 1030 of each light detector 1005 per unit time. With an assumption of uniform light distribution in the lower hemisphere, corresponding irradiance values can be determined by integration such that each light detector 1005 reading includes a pair of radiance value and irradiance value.

The relationship between a reading by the incident light sensor 800 and exposure of the target looking sensor 1000 may be established by characterizing the light detectors 1005 with a nominal exposure time and determining the maximum irradiance value of the light detectors 1005 ($E_{Detector\ max}$), which indicates the maximum sensitivity of the light detectors 1005 or the maximum light the light detectors 1005 can manage under the nominal exposure time.

$E_{Detector\ max}$ may be determined empirically. Alternatively, $E_{Detector\ max}$ may be determined from a corresponding maximum radiance value of the light detectors 1005 ($L_{Detector\ max}$), assuming an isotropic light distribution. In some embodiments, $L_{Detector\ max}$ is determined by using an observed solar irradiance ($E_{Sun\ obs}$) and comparing radiance values of the light detectors at a particular point in time, position, and location associated with $E_{Sun\ obs}$.

The relationship between $E_{Detector\ max}$ and $L_{Detector\ max}$ is illustrated by the following equation:

$$E_{Detector\ max} = \frac{(L_{Detector\ max} * 4\pi)}{STR_{Detector}} \qquad [\text{Eq. 2}]$$

$STR_{Detector}$ is the field of view of the detector at nadir in steradians, and $L_{Detector\ max}$ is the maximum radiance value of the light detectors 1005 at saturation.

The relative scale between the observed solar irradiance ($E_{Sun\ obs}$) and the maximum target detector irradiance ($E_{Detector\ max}$) can then be obtained. This is useful because, within optical wavelengths of the spectrum at the Earth surface, almost all of the entire light signal coming to the target looking sensor 1000 is reflected from target surfaces, which depends on incident light from the Sun ($E_{Sun\ obs}$).

The proportion between $E_{Sun\ obs}$ and $E_{Detector\ max}$ can be used to scale the nominal exposure time of the array light detectors 1005 in the target looking sensor 1000. In some embodiments, the nominal exposure time (Detector Exposure Time$_{Nominal}$) is determined during sensor design when exposing the array of light detectors 1005 to radiances between levels of undersaturation and oversaturation.

The calculation of exposure time of the array of light detectors 1005 can be performed by solving the following proportion set:

$$\frac{E_{Sun\ obs}}{E_{Detector\ max}} = \frac{\text{Detector Exposure }Time_{Current}}{\text{Detector Exposure }Time_{Nominal}} \qquad [\text{Eq. 3}]$$

Solving Equation 3 for Detector Exposure Time$_{current}$, avoids understaturation and overstaturation of the array of light detectors 1005.

In some embodiments, Equation 3 allows the array of light detectors 1005 of the target looking sensor 1000 to make meaningful capture of signals from surfaces ranging from 0 to 1 in their reflectivity properties. This range cannot be observed by traditional imaging systems purposed for in-season observation of crops or other vegetation types.

Knowledge of target reflectivity properties further optimizes exposure time of the target looking sensor 1000 of the UAS-carried imaging system. The ranges of reflectivity properties for different wavelength bands may be obtained from publicly available and/or proprietary radiative transfer models relating to optical properties of targets and their changes in time. The maximum reflectivity of a target ($\rho_{Max\ target}$) can be applied to Equation 3 to narrow focus of detector sensitivity to specific target signals, as illustrated by the following equation:

$$\frac{\rho_{Max\ target} * E_{Sun\ obs}}{E_{Detector\ max}} = \frac{\text{Detector Exposure }Time_{Current}}{\text{Detector Exposure }Time_{Nominal}} \qquad [\text{Eq. 4}]$$

Solving Equation 4 for Detector Exposure Time$_{current}$ completes optimization of exposure settings in the UAS-carried imaging system.

Further steps may be taken to optimize gains of the target looking sensor 1000 by adjusting for the minimum target reflectivity of a target ($\rho_{Min\ target}$). This would enhance radiometric resolution, which is out the scope of this disclosure.

Figure 11:
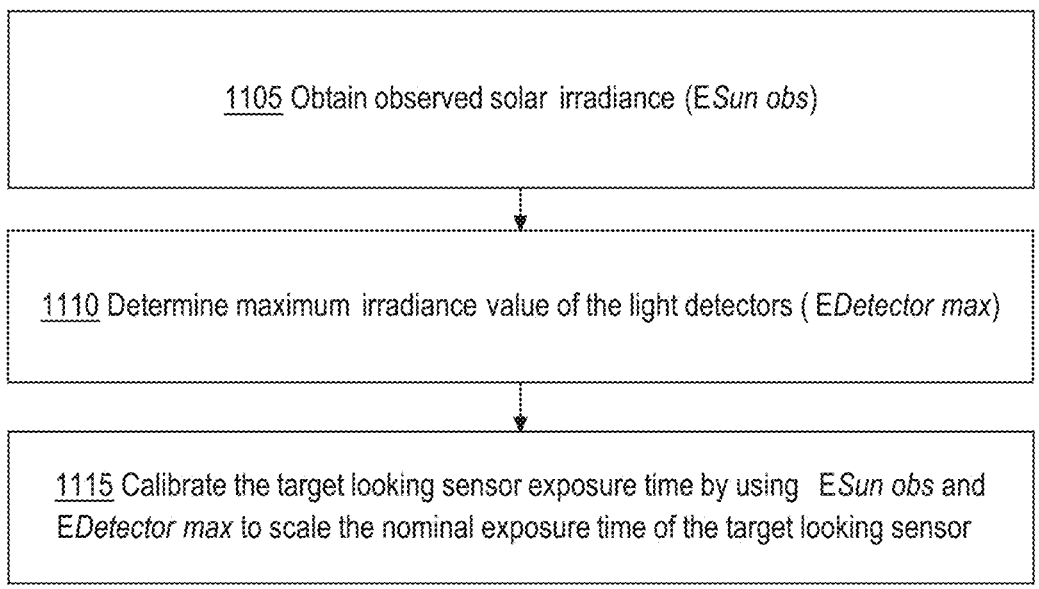
FIG. 11 illustrates an example method for controlling exposure time in an imaging instrument, in accordance with some embodiments.

FIG. 11 illustrates an example method of controlling exposure time of a target looking sensor for a UAS mission, in accordance with some embodiments. The target looking sensor is part of the UAS-carried imaging system onboard of the UAS. The target looking sensor includes basic elements such as an array of light detectors, exposure time controller, light filter, and a lens.

Method 1100 begins at a step 1105, where an observed solar irradiance ($E_{Sun\ obs}$) is obtained. $E_{Sun\ obs}$ may be obtained such as from the method 900. Alternatively, $E_{Sun\ obs}$ may be obtained by using additional device(s), such as a pyranometer, and/or calibration step(s), such as spectral adjustment, purposed to obtain $E_{Sun\ obs}$ instantly.

At step 1110, the maximum irradiance value of the light detectors ($E_{Detector\ max}$) is determined. In some embodiments, the $E_{Detector\ max}$ is determined empirically. In other embodiments, $E_{Detector\ max}$ is determined from a corresponding maximum radiance value of the array of light detectors ($L_{Detector\ max}$), assuming an isotropic light distribution. The relationship between $E_{Detector\ max}$ and $L_{Detector\ max}$ is illustrated by Equation 2.

At step 1115, exposure time of the target looking sensor is calibrated by using the proportion between the observed solar irradiance ($E_{Sun\ obs}$) from step 1105 and the maximum target detector irradiance ($E_{Detector\ max}$) from step 1110 to scale a nominal exposure time (Detector Exposure Time$_{Nominal}$) of the array light detectors in the target looking sensor. In some embodiments, the nominal exposure time is determined during sensor design when exposing the array of light detectors to radiances between levels of undersaturation and oversaturation.

In some embodiments, the maximum reflectivity of a specific target ($\rho_{Max\ target}$) can be obtained and applied, at step 1115, as a factor to narrow the range of sensitivity for better sensitivity to signals of the target.

The method 1100 optimizes exposure settings in the target looking sensor of the UAS-carried imaging system.

3.3 Procedural Overview

Figure 12:
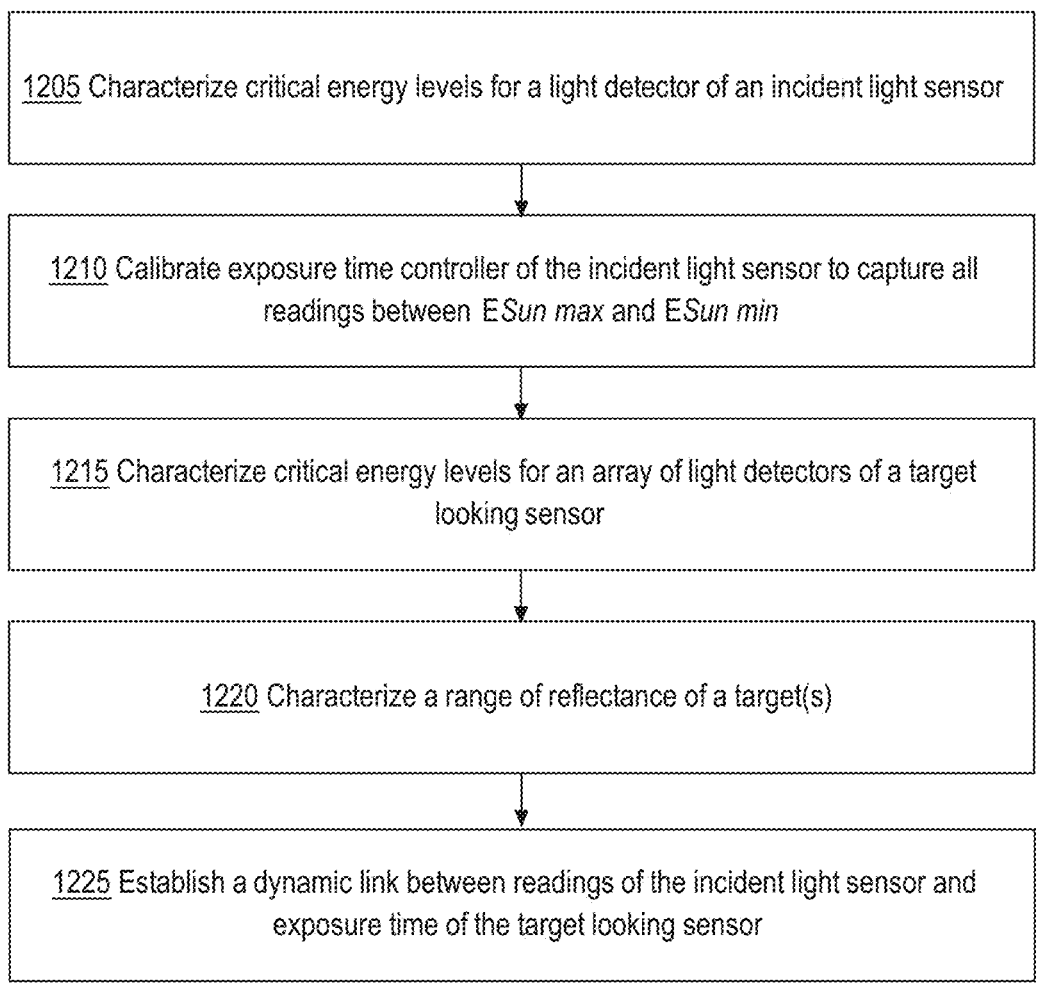
FIG. 12 illustrates an example method of calibrating a UAS-carried imaging system, in accordance with some embodiments.

FIG. 12 illustrates an example method of calibrating a UAS-carried imaging system, in accordance with some embodiments. In some embodiments, method 1200 of FIG. 12 relates to an imaging system characterization procedure performed in a laboratory setting. Characterizations and/or calibrations are needed for proper functioning of different components of the UAS-carried imaging system during field missions.

Method 1200 begins at step 1205, where critical energy levels for a light detector of an incident light sensor are characterized at various exposure times. Step 1205 may be performed in a laboratory setting. The solar irradiance ($E_{Sun\ min}$) for a given wavelength at the lowest elevation angle allowed by a light diffuser of the incident light sensor and the solar irradiance ($E_{Sun\ max}$) for a given wavelength at the maximum elevation angle of an acquisition campaign (for example, a UAS mission) are obtained. $E_{Sun\ min}$ and/or $E_{Sun\ max}$ may be obtained from publicly available sources of information on sun position and on seasonal atmospheric conditions.

At step 1210, exposure time controller of the incident light sensor is calibrated to capture all readings between $E_{Sun\ max}$ and $E_{sun\ min}$. A broad range of conditions may be simulated in order to capture variabilities of solar irradiance values of $E_{Sun\ max}$ and $E_{Sun\ min}$. A reading is converted to observed solar irradiance ($E_{Sun\ obs}$).

At step 1215, critical energy levels for an array of light detectors of a target looking sensor are characterized. The maximum radiance and irradiance values of the light detectors at a nominal exposure time are determined. The maximum irradiance value of the light detectors ($E_{Detector\ max}$) captures the maximum light level which the light detectors can manage under the nominal exposure time. $E_{Detector\ max}$ may be determined empirically or from the corresponding maximum radiance value of the array of light detectors ($L_{Detector\ max}$) associated with $E_{Sun\ obs}$.

At step 1220, a range of reflectance of a target(s) during the acquisition campaign is characterized. The range includes the reflectance values between minimum reflectivity of the target ($\rho_{Min\ target}$) and the maximum reflectivity of the target ($\rho_{Max\ target}$). In some embodiments, the reflectance range, only Min target, or only $\rho_{Max\ target}$ is used at step 1225. The range of reflectance values of the target may be obtained from publicly available and/or proprietary radiative transfer models.

At step 1225, a dynamic link/transformation between readings of the incident light sensor and exposure time of the target looking sensor is established by implementing Equations 3 and 4 in the system controller. The proportion between the observed solar irradiance ($E_{Sun\ obs}$) and the maximum target detector irradiance ($E_{Detector\ max}$) may be used to scale the nominal exposure time of the array light detectors in the target looking sensor. A factor, such as $\rho_{Max\ target}$, may be used to narrow the range of sensitivity for better sensitivity to signals of the target.

In some embodiments, characterizing critical energy levels for the light detector of the incident light sensor at step 1205, characterizing critical energy levels of the array of light detectors of the target looking sensor at step 1215, and/or characterizing range of reflectance of reflectance of the target(s) at step 1220 mean or otherwise relate to capturing relationships between commercial grade sensor readings and precise measurements of light by scientific instruments.

Figure 13:
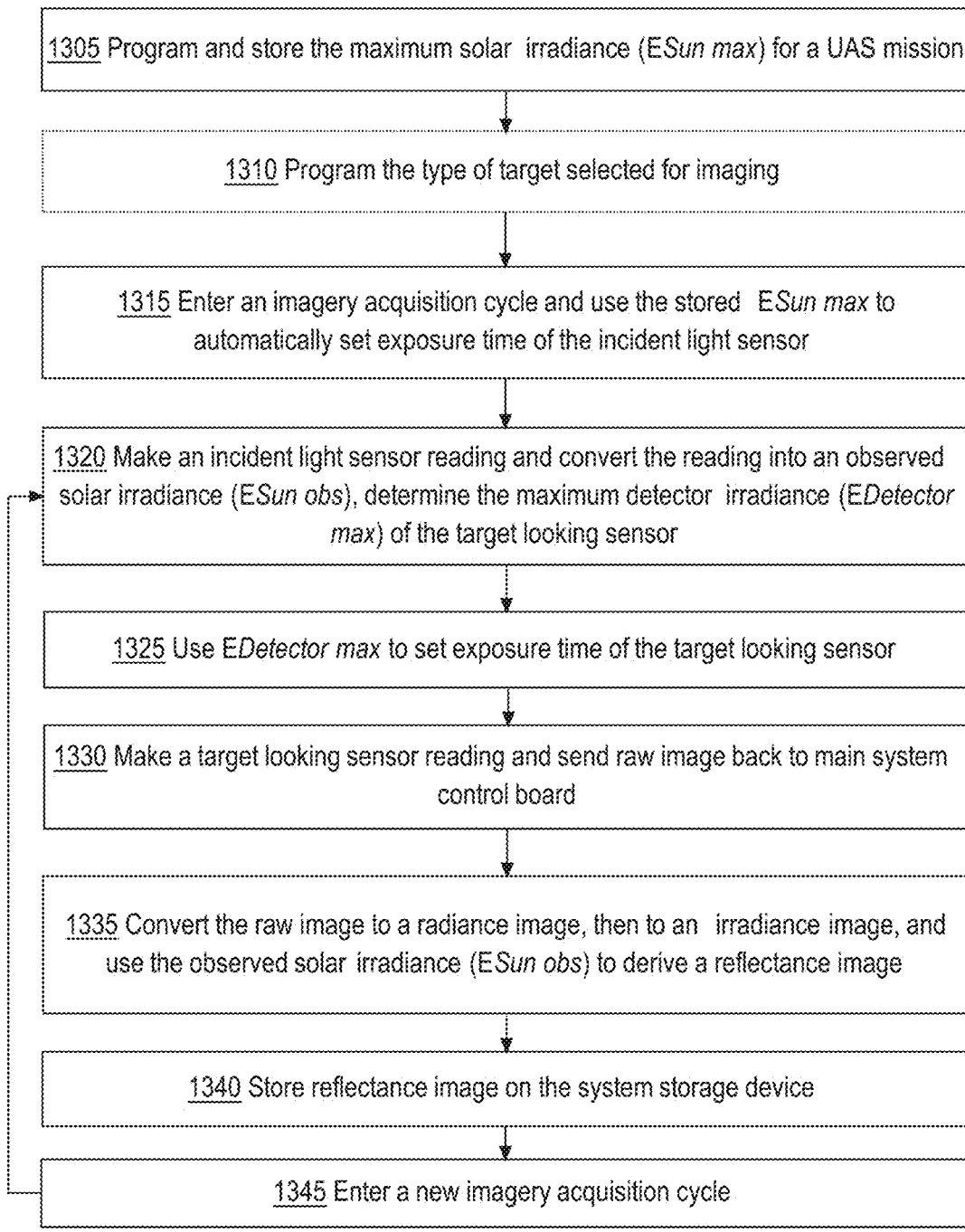
FIG. 13 illustrates an example workflow for a UAS-carried imaging system during a UAS mission, in accordance with some embodiments.

FIG. 13 illustrates an example workflow for a UAS-carried imaging system during a UAS mission, in accordance with some embodiments. Workflow 1300 includes operations, functions, and/or actions as illustrated by blocks 1305-1345. Although the blocks 1305-1345 are illustrated in order, the blocks may also be performed in parallel, and/or in a different order than described herein. The workflow 1300 may also include additional or fewer blocks, as needed or desired. For example, the blocks 1305-1345 can be combined into fewer blocks, divided into additional blocks, and/or removed based upon a desired implementation. In some embodiments, the workflow 1300 occurs after an in-lab characterization of an incident light sensor and/or a target looking sensor.

At block 1305, a user programs the maximum solar irradiance ($E_{Sun\ max}$) for the UAS mission via an input device (for example, a tablet) coupled with the communication interface of the main system control board. This parameter is stored in the main system control board. Since the minimum solar irradiance ($E_{Sun\ min}$) relates to the lowest elevation angle allowed by the light diffuser 820, in some embodiments, $E_{Sun\ min}$ is preprogrammed and stored in the main system control board.

At optional block 1310, in dotted outline, the user programs the type of target selected for imaging. The main system control may store a plurality of different targets and corresponding ranges of reflectance of the targets. A target range may include the reflectance between minimum reflectivity of the target ($\rho_{Min\ target}$) and the maximum reflectivity of the target ($\rho_{Max\ target}$).

At block 1315, the UAS-carried imaging system enters an imagery acquisition cycle. During the imagery acquisition cycle, the incident light sensor uses the stored maximum solar irradiance ($E_{Sun\ max}$) to automatically set its exposure time.

At block 1320, a reading is made by the light detector of the incident light sensor and is sent to the main system control board, where one or more routines convert the reading into an observed solar irradiance ($E_{Sun\ obs}$) and, in turn, determines the maximum detector irradiance ($E_{Detector\ max}$) of the target looking sensor.

At block 1325, the target looking sensor automatically uses $E_{Detector\ max}$ to set its exposure time. In some embodiments, the target looking sensor adjusts the exposure time according to the range of reflectance of the selected target type to narrow detector sensitivity particular to the target type.

At block 1330, a reading is made by the array of light detectors of the target looking sensor during the exposure time and the raw image (reading) is sent back to the main system control board.

At block 1335, one or more routines, derived from the incident light sensor characterization, convert the raw image to a radiance image and then to an irradiance image. The observed solar irradiance ($E_{Sun\ obs}$) is used to derive a reflectance image.

At block 1340, the reflectance image is stored on the system storage device.

At block 1345, the UAS-carried imaging system enters a new imagery acquisition cycle, resuming at block 1320, until the UAS mission is completed or otherwise stopped.

Reflectance images stored on the system storage device may be retrieved after the UAS mission or, in real-time, during the UAS mission by the user's device (tablet), the agricultural intelligence computer system 130 of FIG. 1, or other computing devices.

Although the disclosure discusses the UAS-carried imaging system being mounted to a UAS, it can be mounted to a fixed wing craft or other field equipment.

The approaches disclosed herein provide the practical result of optimizing the exposure time of a target looking sensor of a UAS-carried imaging system during a UAS mission. Data from an incident light sensor is processed in real-time to calibrate exposure time of the target looking sensor to avoid overexposure and underexposure. A dynamic link/transformation between readings of the incident light sensor and exposure time of the target looking sensor enables the UAS-carried imaging system to adapt to illumination condition(s) when readings are taken by the target looking sensor by using readings of the incident light sensor. The disclosed approaches eliminate material costs, labor costs, and post-processing calibration efforts that would otherwise be required, for all the reasons set forth in the preceding paragraphs.

4. Other Aspects of Disclosure

In the foregoing specification, embodiments of the invention have been described with reference to numerous specific details that may vary from implementation to implementation. Thus, the sole and exclusive indicator of what is the invention and, is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A method of calibrating an imaging system in real-time, comprising:
    establishing a dynamic link expressing a proportional relationship between a first reading by a first sensor and an exposure time of a second sensor; and
    calibrating the exposure time of the second sensor based on the dynamic link.

2. The method of claim 1, wherein method is performed using an unmanned aircraft system (UAS) during one UAS mission.

3. The method of claim 2, comprising obtaining the first reading by the first sensor.

4. The method of claim 3, wherein obtaining the first reading comprises:
    obtaining solar irradiance (Esun min) for a given wavelength at the lowest elevation angle allowed by a light diffuser of the first sensor;
    obtaining solar irradiance (Esun max) for the given wavelength at the maximum elevation angle of the one UAS mission;
    calibrating exposure time of the first sensor to capture readings between Esun min and Esun max; and
    transforming the first reading into an observed solar irradiance (Esun obs).

5. The method of claim 3, wherein establishing a dynamic link comprises: determining, based on Esun obs, a maximum radiance value (LDetector max) of an array of light detectors of the second sensor; and
    determining, based on LDetector max, a maximum irradiance value (EDetector max) of an array of light detectors of the second sensor.

6. The method of claim 5, wherein the dynamic link is a proportion between Esun obs and EDetector max.

7. The method of claim 6, wherein calibrating the exposure time of the second sensor based on the dynamic link comprises applying the proportion as a scale to a nominal exposure time of the second sensor.

8. The method of claim 6, wherein the dynamic link comprises a factor.

9. The method of claim 8, wherein the factor is a maximum reflectivity of a target (pMax target).

10. The method of claim 1, wherein the imaging system is coupled with an unmanned aircraft system (UAS).

11. The method of claim 10, wherein the first sensor is an upwards looking sensor on the UAS and the second sensor is a downwards looking sensor on the UAS.

12. The method of claim 1, comprising obtaining a second reading by the second sensor during the calibrated exposure time.

13. An imaging system comprising:
    a first sensor, a second sensor, and a system control board all communicatively coupled together; and
    wherein the system control board is configured to:
        establish a dynamic link expressing a dynamic relationship between a first reading from the first sensor and an exposure time of the second sensor; and
        calibrate the exposure time of the second sensor based on the dynamic link.

14. The imaging system of claim 13, wherein communication between the first sensor, the second sensor, and the system control board is provided in real-time during one unmanned aircraft system (UAS) mission.

15. The imaging system of claim 14, wherein the first sensor is configured to obtain a first reading.

16. The imaging system of claim 15, wherein the first reading is obtained by: obtaining solar irradiance (Esun min) for a given wavelength at the lowest elevation angle allowed by a light diffuser of the first sensor;
    obtaining solar irradiance (Esun max) for the given wavelength at the maximum elevation angle of the one UAS mission;
    calibrating exposure time of the first sensor to capture readings between Esun min and Esun max; and
    transforming the first reading into an observed solar irradiance (Esun obs).

17. The imaging system of claim 16, wherein the dynamic link is established by: determining, based on Esun obs, the maximum radiance value (LDetector max) of an array of light detectors of the second sensor; and
    determining, based on LDetector max, the maximum irradiance value (EDetector max) of an array of light detectors of the second sensor.

18. The imaging system of claim 17, wherein the dynamic link is a proportion between Esun obs and EDetector max.

19. The imaging system of claim 18, wherein the proportion is applied as a scale to a nominal exposure time of the second sensor.

20. The imaging system of claim 18, wherein the dynamic link includes a factor.

21. The imaging system of claim 20, wherein the factor is maximum reflectivity of a target (pMax target).

22. The imaging system of claim 13, wherein the imaging system is coupled with an unmanned aircraft system (UAS).

23. The imaging system of claim 22, wherein the first sensor is an upwards looking sensor on the UAS and the second sensor is a downwards looking sensor on the UAS.

24. The imaging system of claim 13, wherein the second sensor is configured to obtain a second reading during the calibrated exposure time.

* * * * *

UNITED STATES PATENT AND TRADEMARK OFFICE
CERTIFICATE OF CORRECTION

PATENT NO. : 11,805,321 B2
APPLICATION NO. : 17/672335
DATED : October 31, 2023
INVENTOR(S) : Basnet et al.

It is certified that error appears in the above-identified patent and that said Letters Patent is hereby corrected as shown below:

In the Specification

In Column 21, Line 21, delete "Uas-Carried" and insert -- UAS-Carried --, therefor.
In Column 22, Line 25, delete "adjacent one" and insert -- adjacent to one --, therefor.
In Column 23, Line 59, delete "Example" and insert -- Examples of --, therefor.
In Column 24, Line 1, delete "$E_{Sun\ min}$ A" and insert -- $E_{Sun\ min.}$ A --, therefor.
In Column 24, Line 22, delete "adjacent one" and insert -- adjacent to one --, therefor.
In Column 25, Line 38, delete "$Time_{current}$," and insert -- $Time_{Current}$, --, therefor.
In Column 25, Line 39, delete "understaturation and overstaturation" and insert -- undersaturation and oversaturation --, therefor.
In Column 25, Line 63, delete "$Time_{current}$," and insert -- $Time_{Current}$, --, therefor.
In Column 26, Line 2, delete "out the" and insert -- outside the --, therefor.
In Column 26, Line 64, delete "$E_{sun\ min.}$" and insert -- $E_{Sun\ min.}$ --, therefor.
In Column 27, Line 16, delete "Min target," and insert -- $\rho_{Min\ target}$, --, therefor.
In Column 27, Line 35, delete "of reflectance of reflectance" and insert -- of reflectance --, therefor.

In the Claims

In Column 29, Line 46, in Claim 4, delete "(Esun min)" and insert -- ($E_{Sun\ min}$) --, therefor.
In Column 29, Line 49, in Claim 4, delete "(Esun max)" and insert -- ($E_{Sun\ max}$) --, therefor.
In Column 29, Line 53, in Claim 4, delete "Esun min and Esun max;" and insert -- $E_{Sun\ min}$ and $E_{Sun\ max}$; --, therefor.
In Column 29, Line 55, in Claim 4, delete "(Esun obs)." and insert -- ($E_{Sun\ obs}$). --, therefor.
In Column 29, Line 57, in Claim 5, delete "Esun obs," and insert -- $E_{Sun\ obs}$, --, therefor.
In Column 29, Line 58, in Claim 5, delete "(LDetector max)" and insert -- ($L_{Detector\ max}$) --, therefor.
In Column 29, Line 60, in Claim 5, delete "LDetector max," and insert -- $L_{Detector\ max}$, --, therefor.
In Column 29, Line 61, in Claim 5, delete "(EDetector max)" and insert -- ($E_{Detector\ max}$) --, therefor.
In Column 29, Line 64, in Claim 6, delete "Esun obs and EDetector max." and insert -- $E_{Sun\ obs}$ and $E_{Detector\ max}$. --, therefor.

Signed and Sealed this
Twenty-first Day of May, 2024

*Katherine Kelly Vidal*

Katherine Kelly Vidal
*Director of the United States Patent and Trademark Office*

CERTIFICATE OF CORRECTION (continued)
U.S. Pat. No. 11,805,321 B2

Page 2 of 2

In Column 30, Line 6, in Claim 9, delete "(pMax target)." and insert -- ($\rho_{Max\ target}$). --, therefor.
In Column 30, Line 32, in Claim 16, delete "(Esun min)" and insert -- ($E_{Sun\ min}$) --, therefor.
In Column 30, Line 35, in Claim 16, delete "(Esun max)" and insert -- ($E_{Sun\ max}$) --, therefor.
In Column 30, Line 39, in Claim 16, delete "Esun min and Esun max;" and insert -- $E_{Sun\ min}$ and $E_{Sun\ max}$; --, therefor.
In Column 30, Line 41, in Claim 16, delete "(Esun obs)." and insert -- ($E_{Sun\ obs}$). --, therefor.
In Column 30, Line 42, in Claim 17, delete "Esun obs," and insert -- $E_{Sun\ obs}$, --, therefor.
In Column 30, Line 43, in Claim 17, delete "(LDetector max)" and insert -- ($L_{Detector\ max}$) --, therefor.
In Column 30, Line 45, in Claim 17, delete "LDetector max," and insert -- $L_{Detector\ max}$, --, therefor.
In Column 30, Line 46, in Claim 17, delete "(EDetector max)" and insert -- ($E_{Detector\ max}$) --, therefor.
In Column 30, Line 49, in Claim 18, delete "Esun obs and EDetector max." and insert -- $E_{Sun\ obs}$ and $E_{Detector\ max}$. --, therefor.
In Column 30, Line 56, in Claim 21, delete "(pMax target)." and insert -- ($\rho_{Max\ target}$). --, therefor.